L. J. MONAHAN.
AUTOMATIC SPEED DETERMINER.
APPLICATION FILED NOV. 1, 1917.
1,281,629.
Patented Oct. 15, 1918.
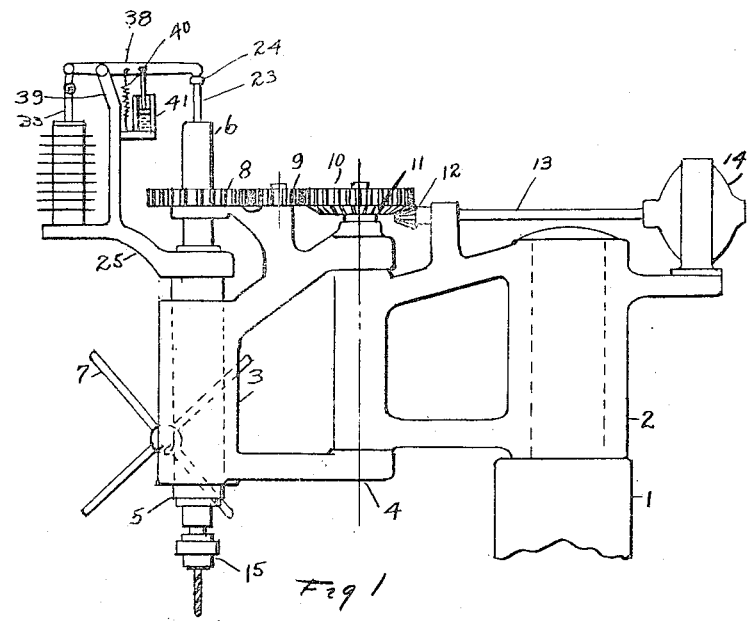
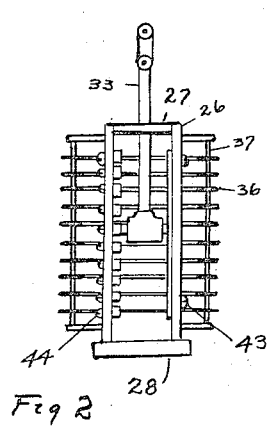
Fig 2
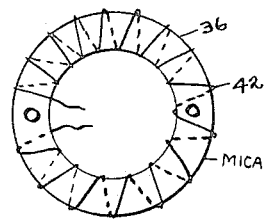
Fig 6
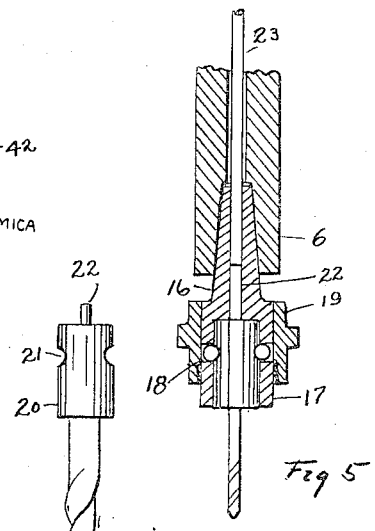
Fig 4
Fig 5
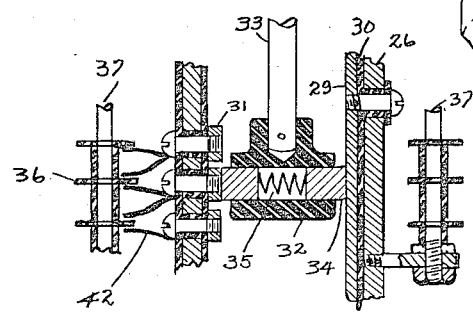
Fig 3
INVENTOR
Louis J Monahan

UNITED STATES PATENT OFFICE.

LOUIS J. MONAHAN, OF OSHKOSH, WISCONSIN.

AUTOMATIC SPEED-DETERMINER.

1,281,629.

Specification of Letters Patent.   Patented Oct. 15, 1918.

Application filed November 1, 1917.   Serial No. 199,696.

*To all whom it may concern:*

Be it known that I, LOUIS J. MONAHAN, a citizen of the United States, residing at Oshkosh, in the county of Winnebago and State of Wisconsin, have invented new and useful Improvements in Automatic Speed-Determiners, of which the following is a specification.

The invention relates to a new and useful attachment for machine tools entitled automatic speed determiner.

The object of the invention is to provide a device that may be attached to machine tools, preferably drill presses, wherein, the proper speed to suit the tool or drill will automatically be determined by the placing of the tool in the machine.

In the drawing Figure 1 shows the device mounted on a radial drill; Fig. 2 a detail of the speed controller; Fig. 3 an enlarged view of a portion of the controller; Fig. 4 a view of a large drill with special shank; Fig. 5 a small drill fitted in socket and Fig. 6 a view of resistance winding.

In machining metal, especially drilling operations, which requires constant change of tools or drills for the different size holes, it is necessary to constantly change the speed of the drill to obtain the most efficient results. Quick change chucks are in use whereby the different size drills can be inserted or removed while the chuck is revolving but the speed must be changed to suit each size of drill by means of shifting change gears or belts on care pulleys. This system requires the operator to use his judgment as to the proper speed which is not universally satisfactory and to overcome this objection the herein disclosed invention has been worked out, by which use the burden of choosing speeds is eliminated.

The invention contemplates an electric motor drive as shown in Fig. 1 wherein 1 is a column of radial drill press, 2 a revolving bracket fitted on the column and free to swing therearound. Another bracket 3 is fitted to swing at 4 which forms a conventional swinging arm. The bracket 3 carries the drill spindle sleeve 5 and spindle 6 which is raised and lowered by the hand wheel 7 in the usual way. The spindle is driven by means of a train of gears 8, 9, 10, 11 and 12 from the shaft 13 which is coupled to an electric motor 14 mounted on the bracket 2. At the lower end of the spindle a quick change chuck 15 is fitted and which is shown in detail on Fig. 5.

This chuck is of ordinary construction wherein the shank 16 is fitted into the spindle 6 and has a hole through its axis, a portion 17 is formed with the shank and has a pair of balls or rollers 18 fitted loosely in slots through its walls. A sliding ring 19 is fitted loosely over the portion 17 so it can be moved up and down while revolving to hold the balls or rollers on their inner position or allow them to fly out against the lower portion of the ring 19 when it is moved upward. The drills of various sizes have a cylindrical shank 20 of uniform size to fit in the chuck 17. Slots 21 are formed in the shank which allow the balls or rollers to drop in and lock it within the chuck while revolving. To remove the drill for changing sizes the collar 19 is raised up allowing the balls or rollers to fly outward far enough so the drill and shank can be drawn out. There are various forms of quick change chucks on the market but this type suffices to show the principle of operation.

This invention contemplates means coöperative between the inserting of these drills and the speed control and to accomplish the purpose an extending pin 22 is fitted to the drill shank, the length of this pin varying with the size of drill.

To transmit control from the pin 22 a rod 23 is fitted to slide through the spindle 6 and has a ball bearing 24 on top. By inserting different drills in the chuck the rod 23 will be relatively raised to different points determined by the length of the pins 22.

The mechanism of control comprises a resistance controller which is mounted on the sleeve 5 by means of a bracket 25 and consists of a pair of plates 26 held together by spacers 27 and 28. On one of the plates a long strip of brass 29 is mounted and spaced therefrom by fiber insulating material 30. On the opposite side a plurality of plates or studs 31 are mounted and insulated therefrom as shown.

A plunger composed of insulating material 32 is fitted to an actuating rod 33 which extends up through the top of the controller. Brushes 34 are fitted in the block 32 and have a spring 35 fitted there between to force them out against the brass plates 29 and 31 so the current will be carried from one side to the other through the brushes and spring.

Resistance coils are provided and composed of a series of mica washers 36 fitted around the device and spaced apart by insulating material on supporting rods 37.

The plunger block 32 carrying the contact brushes is actuated by the rod 23 through a lever 38 fulcrumed on a bracket 39. A spring 40 is provided to normally hold the parts against the rod 23, so that movement of the rod 23 will cause a corresponding movement of the block 32 along the contact plates 29 and 30.

To prevent too sudden change in the movement along the plates when a drill is removed, an oil dash pot 41 is fitted to the bracket 39 and has its plunger pivoted to the lever 28.

The washers 36 are wound with resistance wire 42 and connected from one plate 31 to its next adjacent plate so that by sliding the brushes along the plates more or less resistance is thrown in between terminals 43 and 44 which when connected into the motor line will vary the speed according to the amount of resistance cut in.

In operation the current to operate the motor which drives the tools is taken through the rheostat Fig. 2 on one line and direct to the motor on the other line. By moving the rheostat brushes along the plates 29 and 31 the motor will respond in higher or lower speed depending on the amount of resistance thrown in this line.

It will therefore be seen that by the placing of different drill sockets in the chuck with varying length of pins 22 that various chucks speeds result so that by giving the proper length to the pins the speed best suited to the drill attached thereto can be automatically obtained.

While other methods may suggest themselves to accomplish this result I do not wish to be limited to this particular construction and claim:—

1. In a drilling machine having electrical driven drill holder, a plurality of separate insertible drills having variable determination points depending on the size of the drill, means for varying the speed of the drill holder comprising the coacting of the determination point with suitable devices to effect suitable speed for the inserted drill.

2. In a drilling machine having a suitable quick change drill holder, a control for said variable speed driving means, a variable speed driving means for driving the holder, a plurality of drills insertible in the holder and having varying determination varying in dimensions with the size of the drills, the said portions being portions engageable with devices coacting with control of the variable speed driving means whereby the speed of each drill is determined.

3. In a drilling machine having a drill holder and variable speed driving device with speed controlling means, a plurality of drill shanks having drills insertible therein, attachments fitted to the shanks and varying according to the size of the drills and adapted to coöperate with the speed controlling means whereby a definite speed is determined by the inserting of one of the shanks in the holder.

4. In a machine tool having a variable speed driving means, a controlling mechanism, a tool holder, tools insertible in the holder and having attachments formed therewith varying with the size of the tools for acting on the controlling mechanism by inserting same in the tool holder.

5. In a drilling machine having a quick change drill chuck, a variable speed electric drive, a rheostat capable of introducing resistance to effect speed change in the electric drive, a plurality of drill shanks adapted to fit the chuck and having speed determining extensions thereon varying in the length according to the size of the drill, the said extensions adapted to actuate the rheostat when inserted in the chuck.

6. In a drilling machine the combination with a variable speed electric drive, a rheostat having a controlling device, a chuck, a plurality of drill shanks insertible in the chuck and having speed determining extensions adapted to act on the rheostat controlling device when inserted in the chuck.

7. In a drilling machine the combination with a drill chuck, of variable speed driving means, drill shanks carrying drills and insertible in said chuck and having extensions thereon, the said extensions varying according to the size of said drills, a speed controlling device adapted to coöperate with the said extensions when the said shanks are inserted in the chuck.

8. In a drilling machine the combination with a variable speed drill chuck, a speed controlling device for said chuck, drill shanks insertible in the chuck, means formed on the shanks for coacting with the controlling device, the said means having varying dimensions according to the size of drill used in the shank.

9. An automatic speed determiner comprising a variable speed drill chuck, a speed controlling device associated adjacent to the drill chuck, drill shanks insertible in the chuck and having variable determination points formed therewith for acting on the speed controlling device when inserted in the chuck, the determination points being varied to suit the size of drill used whereby the speed of the chuck is determined.

10. In an automatic speed determiner, a variable speed tool holder, a speed controlling device, tools having determination points with varied dimensions according to the size of tools used insertible in the holder
5 and adapted to act on the speed controlling device when so inserted whereby the speed of the tool is determined.

In testimony whereof I have set my hand in the presence of two witnesses.

LOUIS J. MONAHAN.

Witnesses:
J. FARRELL,
MARY MONAHAN.